C. F. KOLLIN.
WATERING DEVICE.
APPLICATION FILED JAN. 26, 1920.
1,350,411.
Patented Aug. 24, 1920.
2 SHEETS—SHEET 2.
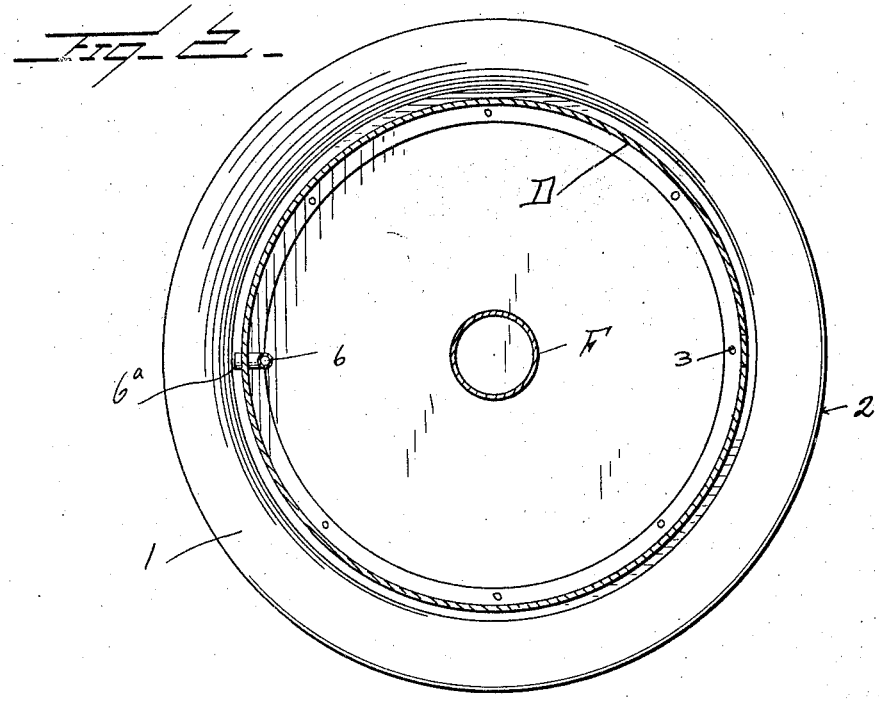
Inventor
C. F. Kollin
By Watson E. Coleman
Attorney

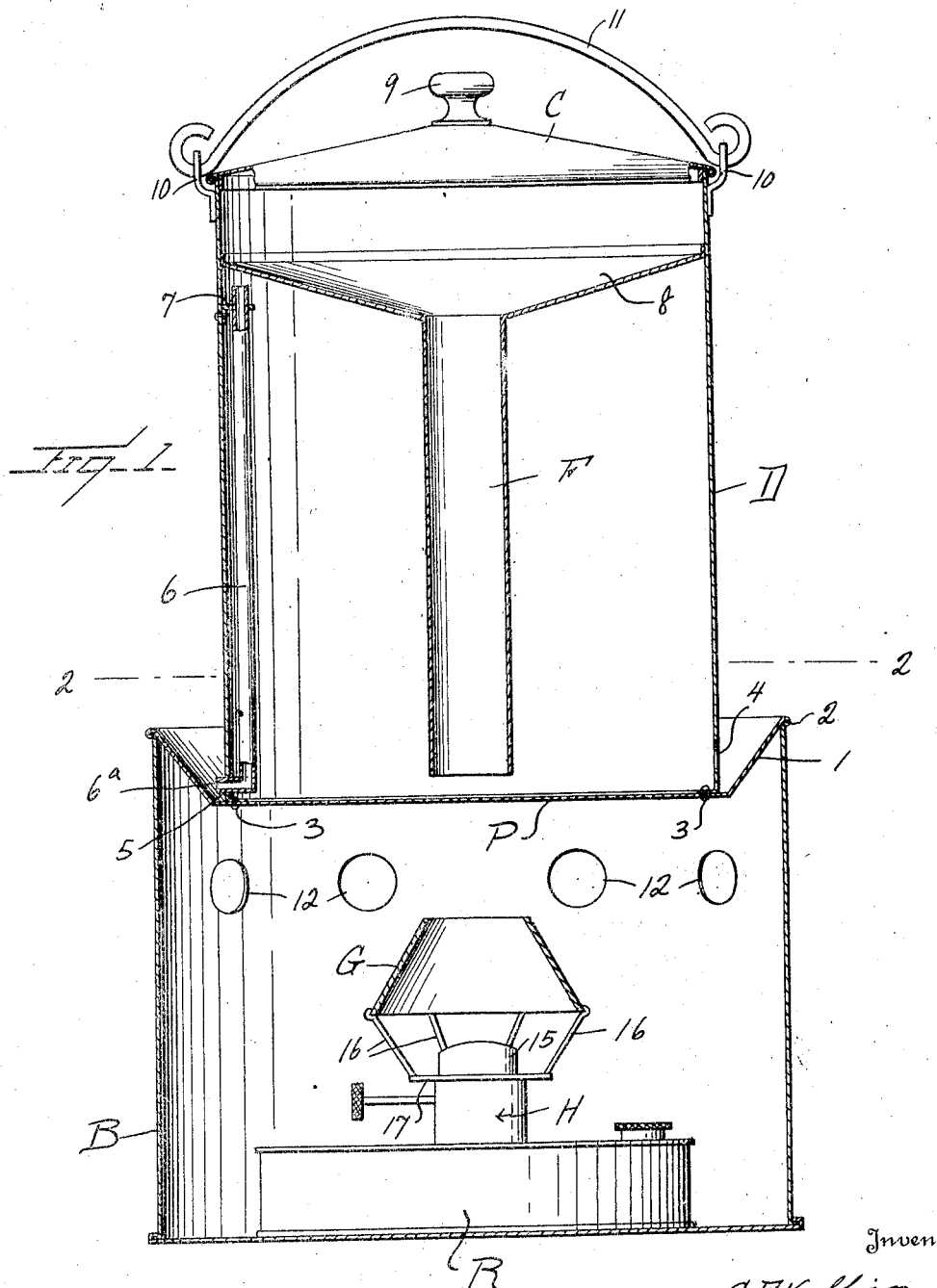

UNITED STATES PATENT OFFICE.

CARL F. KOLLIN, OF MARSHALLTOWN, IOWA, ASSIGNOR OF ONE-HALF TO GEORGE P. THORNBLADE, OF MARSHALLTOWN, IOWA.

WATERING DEVICE.

1,350,411.  Specification of Letters Patent.  Patented Aug. 24, 1920.

Application filed January 26, 1920. Serial No. 354,004.

*To all whom it may concern:*

Be it known that I, CARL F. KOLLIN, a citizen of the United States, residing at Marshalltown, in the county of Marshall and State of Iowa, have invented certain new and useful Improvements in Watering Devices, of which the following is a specification, reference being had to the accompanying drawings.

This invention relates to certain improvements in watering devices and has relation more particularly to a device of this general character of a barometric type, and it is an object of the invention to provide a novel and improved device of this general character particularly intended for use in connection with chickens and other fowls.

Another object of the invention is to provide a novel and improved device of this general character provided with means whereby the water is prevented from freezing when the device is set in a low temperature.

An additional object of the invention is to provide a novel and improved device of this general character including a drinking pan with which coacts a reservoir or supply drum wherein the water within the reservoir or supply drum is delivered into the pan in an automatic manner and without the necessity of valves or floats.

The invention consists in the details of construction and in the combination and arrangement of the several parts of my improved watering device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in elevation and partly in vertical section taken through a watering device constructed in accordance with an embodiment of my invention.

Fig. 2 is a sectional view taken substantially on the line 2—2 of Fig. 1; and

Fig. 3 is a fragmentary sectional view illustrating the connection of the knob with the cover with which it coacts.

As disclosed in the accompanying drawings, P denotes a pan of desired dimensions which has its margins defined by an upstanding and outwardly inclined flange 1 with the upper or front marginal portion of said flange 1 returned to provide a bead 2.

The pan P serves as a head for the lower end portion of a drum D which drum may be permanently secured to the pan P through the instrumentality of the rivets 3 or other anchoring means. It is to be noted that the pan P extends upwardly of and surrounds the drum D whereby a drinking trough is provided.

A wall of the drum D at a point within the pan P is provided with an opening 4 through which the water within the drum D is fed within the trough surrounding said drum. The wall of the drum D is also provided with a second opening 5, preferably positioned at a point below the opening 4 and of a diameter less than the opening 4. The opening 5 as herein disclosed, is substantially diametrically opposed to the opening 4 but this, in actual practice, is not essential.

Disposed upwardly within the drum D is an air tube 6, preferably formed of copper, and which has its lower end portion $6^a$ angularly disposed and directed through the opening 5. The portion $6^a$ of the tube 6 is preferably soldered to the portion of the wall of the drum surrounding the opening 5. The upper end portion of the tube 6 is disposed through an annular member or sleeve 7, soldered or otherwise secured to the adjacent wall of the drum D whereby the tube 6 is effectively maintained in applied position.

F denotes a filling tube which, when applied within the drum D, is positioned at substantially the axial center thereof and terminates preferably within one-half inch of the lower end of said drum or the pan P. The opposite end portion of the filling tube F is provided with a substantially concavo-convex head 8 having its concave face outwardly disposed and which head 8 materially facilitates the pouring of the water through the tube F into the drum D.

The major diameter of the head 8 is such as to snugly fit within the upper end portion of the drum D and when the filling tube F is in applied position, said head 8 is located substantially one inch below the upper end of the drum D.

The head 8 of the filling tube F frictionally engages the wall of the drum D and thereby maintains said filling tube F in applied position and also permits the position of the tube F within the drum D to be adjusted with respect to the bottom of the drum D to facilitate the proper positioning of the filling tube F within said drum and particularly with respect to the upper end of the tube 6.

C denotes a removable cover adapted to engage the upper end of the drum D and said cover, at substantially its axial center, is provided with the knob 9 or the like whereby said cover may be readily applied or removed as the occasions of practice may require.

The upper end portion of the drum D has secured exteriorly thereto and at substantially diametrically opposed points the upstanding ears 10 with which are engaged the extremities of a bail 11 whereby the device may be readily and conveniently transported.

In filling the drum D with water, the opening 4 is closed by a plug, by placing a finger thereover or otherwise, and with the cover C removed, the water is poured into the head 8 and passes into the drum D through the filling tube F. As the water level rises within the drum D, it forces the air therein out to the atmosphere through the air tube 6 as the water entering the drum D displaces the air therein. When the opening 4 is open, the water will pass into the trough and will reach a level to seal the opening 5 resulting in automatically checking the flow of the water from within the drum D. The opening 5 is maintained sealed until the level within the trough is reduced to open such opening 5 sufficiently to permit air to pass within the drum D and above the water level therein through the tube 6.

It has been established in practice that no dirt or the like can clog or stop up the tube 6 as the air within the drum D when forced therefrom by the rising of the water level therein will eject said dirt or the like. In the event the tube 6 should be stopped by ice, the water, during a filling operation, poured into the filling tube F will rise in said tube but not in the drum D as the air within the drum D will keep the water from going up therein.

However, I find it of advantage to employ in connection with the drum D and the pan P a suitable heating unit to reduce to a minimum the possibility of freezing. As disclosed in the accompanying drawing, the heating unit H comprises an oil lamp, preferably of a character capable of burning for substantially forty-eight hours without refilling the reservoir R. The heating unit H is adapted to be rested upon the bottom of a cylindrical base B having its top open. The pan P is adapted to snugly fit within the open end portion of the base B and effectually close the same through the instrumentality of the bead 2 hereinbefore referred to. The upper portion of the base B has also provided in the wall thereof the openings 12 to admit air to support combustion and also to permit the exhaust of the products of combustion.

I also find it of advantage to employ in connection with the burner 15 of the heating unit H a chimney or globe G, preferably made of iron and of such design and configuration as to direct the heat emanating from the burner to the central portion of the drum D so that the water therein will be sufficiently heated to maintain the same above a freezing temperature. The globe or chimney G is preferably in the form of a truncated cone with its lower marginal portion provided with the arms 16 whereby the chimney or globe G is supported in spaced relation with respect to a collar 17 which collar surrounds the lower portion of the burner 15.

From the foregoing description, it is thought to be obvious that a watering device constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

A watering device comprising, in combination, a hollow base having its top open, a heating unit arranged within said base, a pan detachably engaged with the open end of the base and closing the same, a drum carried by the pan and serving as a water container, said pan extending beyond the drum and providing a trough, a marginal portion of the trough engaging the upper edge of the base whereby said pan and drum are supported in applied position with respect to the base; a wall of the drum having an opening in communication with the trough, a vertically disposed air tube carried by and arranged within the drum and communicating with the atmosphere through a wall of the drum at a point below the top of the trough, and a filling tube arranged within the drum and having its lower end spaced from the lower end of the drum, the upper portion of the filling tube being provided with a head frictionally engaging the wall of the drum at a point above the upper end of the air tube, said filling tube and head being removable with respect to the drum, the frictional contact of the head of the filling tube with the wall of the drum maintaining said tube in applied position and also permitting the position of the tube within the drum to be adjusted with respect to the bottom of the drum.

In testimony whereof I hereunto affix my signature.

CARL F. KOLLIN.